2,737,511
EXTRACTION OF LACTAM

Irene Marianne Cohn, London, England, assignor to British Celanese Limited, a British company No Drawing. Application August 18, 1953, Serial No. 375,047

Claims priority, application Great Britain September 25, 1952

7 Claims. (Cl. 260—239.3)

This invention relates to improvements in the production of amides.

As is well known, oximes of cyclic ketones may be transformed by treatment with sulphuric acid, oleum, chlorsulphonic acid, phosphorus pentachloride or like strongly acid reagents into lactams. This is the well known Beckmann transformation or rearrangement. This process has found its greatest commercial application in the production of caprolactam from cyclohexanone by first forming the oxime and then transforming to caprolactam. A well known process for this commercial production is the treatment of cyclohexanone oxime with concentrated sulphuric acid or oleum. When the transformation is complete the acid liquor is neutralised with ammonia or caustic soda or caustic potash and the resulting sulphate crystallised from the reaction liquor so as to leave substantially only the lactam in the liquor. Commercially it is advantageous to neutralise with ammonia because the resulting ammonium sulphate can be sold as fertiliser and therefore does not represent a complete loss both of the sulphuric acid and the neutralising agent.

It has now been found that the lactam may be extracted by means of chloroform from the Beckmann transformation mixture after suitable dilution with water without neutralisation. This represents a very considerable advance since the whole or substantially the whole of the sulphuric acid, oleum or other Beckmann reagent is available for re-use after suitable concentration and furthermore there is no expenditure of base for the neutralisation. The partition coefficient of chloroform for extracting caprolactam from an aqueous sulphuric acid medium is such that efficient and economic extraction can take place using systematic methods such as a continuous countercurrent extraction process. There is an optimum value or range to which the Beckmann mixture should be diluted before extraction. Thus in the case of sulphuric acid or oleum as the Beckmann reagent, dilution so that the mixture containing the caprolactam, sulphuric acid and water contains about 100–200 gms. of sulphuric acid per litre of solution, and especially 120–160 gms. of sulphuric acid per litre of solution, gives optimum results in the extraction. These concentrations are concentrations of sulphuric acid in sulphuric acid and water and ignore the caprolactam that is in solution.

The partition coefficient of the chloroform may be increased by mixing with other reagents, notably acetic acid or mono-, di- or tri-chloracetic acids. Thus, for example, very good results can be obtained with a mixture of chloroform and acetic acid in a ratio of 5:1.

The invention is most useful when applied to Beckmann reaction mixtures in which sulphuric acid or oleum or a mixture of sulphuric acid or oleum with acetic acid, monochloracetic acid or the like has been employed for the transformation. In this connection it is noted that when acetic acid, monochloracetic acid or the like is employed in the actual Beckmann mixture and chloroform is employed as the sole extracting agent, some of the acetic acid or chlorinated acetic acid is extracted in the chloroform, so that advantage is thus taken of the higher partition coefficients referred to above. However, the acetic acid or chlorinated acetic acid may also be present with the chloroform in the extracting agent.

In addition to applying the process of the present invention to reaction mixtures obtained using sulphuric acid or oleum or mixtures thereof with acetic acid, chloracetic acid and the like, the invention may be applied to the extraction of caprolactam or other lactam from the reaction mixtures obtained according to U. S. application S. No. 354,648 filed May 12, 1953, according to which sulphuric acid partly neutralised with ammonia and with or without acetic acid, chloracetic acid or the like, is used for the Beckmann transformation. The extraction process of the present invention may also be applied to the mixtures obtained according to U. S. Application S. No. 375,046 filed on even date herewith.

The aqueous solution of acid containing small quantities of lactam may be reconcentrated for further use as the Beckmann transforming agent. In the case of using acetic acid, chloracetic acid or the like together with sulphuric acid as the Beckmann transforming agent, suitable adjustment of the proportion of acetic or chloracetic acid or the like to sulphuric acid may be necessary after concentration.

The following examples illustrate the invention but do not limit it in any way:

*Example 1*

A mixture of 25 parts by weight of caprolactam and 28.6 parts of 98% sulphuric acid resulting from a Beckmann transformation was diluted with 190 parts of cold water (the resulting concentration of sulphuric acid was about 140 grams of sulphuric acid per litre of combined sulphuric acid and water). This mixture was introduced into the bottom of an extraction column and chloroform distributed at the top of the column, the feed rates being approximately 550 parts by weight of chloroform for each 100 parts of solution. The chloroform extract was drawn off at the bottom of the column and the aqueous sulphuric acid towards the top of the column. The latter was reconcentrated by ordinary distillation methods and served for conversion of a further batch of cyclohexanone oxime. The efficiency of the extraction was upwards of 95%.

*Example 2*

The mixture of caprolactam, sulphuric acid and water treated according to Example 1 was extracted with a mixture of 5 parts by weight of chloroform to 1 part by weight of acetic acid. This mixture was fed into the top of the column at a rate of about 500 parts by weight to 100 parts by weight of caprolactam/sulphuric acid solution to be extracted. Again a high extraction efficiency was obtained.

*Example 3*

25 parts by weight of cyclohexanone oxime, 81 parts by weight of acetic acid and 27.5 parts by weight of 98% sulphuric acid were reacted at 120° C. in the usual way to convert the oxime to caprolactam. The mixture was then heated under an absolute pressure of 60 mms. of mercury so as to distil off acetic acid, and distillation was continued until the residue weighed 66 parts. Theoretically it then consisted of 25 parts of lactam, 27 of sulphuric acid and 14 of acetic acid. It was cooled, dissolved in 100 parts of ice-cold water and systematically extracted with 450 parts of chloroform. The yield, showing the combined efficiency of the Beckmann transformation and the extraction, was about 87%.

*Example 4*

25 parts by weight of cyclohexanone oxime, 100 parts of acetic acid and 27.5 parts by weight of 98% sulphuric acid were reacted as in Example 3 at 120° C. to transform the oxime to caprolactam. The resulting mixture was then diluted with 100 parts of water as in Example 3 and extracted directly with chloroform without removal of any of the acetic acid.

While the invention is of greatest value for the working up of caprolactam from acid mixtures containing it, it may be employed to work up other lactams from such mixtures, for example suberone iso-oxime.

Having described my invention, what I desire to secure by Letters Patent is:

1. In a process for the production of a lactam by the Beckmann transformation of the oxime of the corresponding cyclic ketone, the step of extracting lactam from the reaction mixture by means of chloroform in the presence of an aliphatic acid selected from the group consisting of acetic acid and the chloracetic acids.

2. Process for the production of caprolactam by the Beckmann transformation of cyclohexanone oxime, comprising carrying out said transformation in the presence of an aliphatic acid selected from the group consisting of acetic acid and the chloracetic acids and extracting the lactam by means of chloroform in the presence of said aliphatic acid.

3. Process for the production of caprolactam by the Beckmann transformation of cyclohexanone oxime, comprising carrying out said transformation in the presence of acetic acid and concentrated sulphuric acid, diluting the resulting mixture to contain 120–160 grams of sulphuric acid per litre of combined sulphuric acid and water and extracting caprolactam by means of chloroform without neutralising the acid.

4. Process for the production of caprolactam by the Beckmann transformation of cyclohexanone oxime, comprising carrying out said transformation in the presence of acetic acid and concentrated sulphuric acid, diluting the resulting mixture to contain about 140 grams of sulphuric acid per litre of combined sulphuric acid and water and extracting caprolactam by means of chloroform without neutralising the acid.

5. Process for the production of caprolactam by the Beckmann transformation of cyclohexanone oxime, comprising carrying out said tansformation in the presence of acetic acid and concentrated sulphuric acid, diluting the resulting mixture so that it contains 120–160 grams of sulphuric acid per litre of combined sulphuric acid and water and recovering caprolactam by counter-current extraction of the diluted mixture with chloroform without neutralising said mixture.

6. Process according to claim 5, wherein said diluted mixture is extracted with between 450 and 550 parts by weight of chloroform for every 100 parts by weight of said diluted mixture.

7. Process according to claim 5, wherein said diluted mixture is extracted with about 500 parts by weight of chloroform for every 100 parts by weight of said diluted mixture.

References Cited in the file of this patent

UNITED STATES PATENTS

| | | |
|---|---|---|
| 2,423,200 | Moncrieff et al. | July 1, 1947 |

FOREIGN PATENTS

| | | |
|---|---|---|
| 240,459 | Switzerland | May 1, 1946 |
| 894,063 | France | Mar. 6, 1944 |
| 895,785 | France | Apr. 11, 1944 |